United States Patent [19]

Tachigori

[11] Patent Number: 6,062,741
[45] Date of Patent: May 16, 2000

[54] LIGHT-RECEPTIVE MODULE AND A METHOD FOR MANUFACTURING THE SAME

[75] Inventor: Masashi Tachigori, Tokyo, Japan

[73] Assignee: NEC Corporation, Tokyo, Japan

[21] Appl. No.: 09/109,714

[22] Filed: Jul. 2, 1998

[30] Foreign Application Priority Data

Jul. 3, 1997 [JP] Japan .................................. 9-177940

[51] Int. Cl.⁷ .................................................. G02B 6/36
[52] U.S. Cl. ................. 385/88; 385/90; 385/91
[58] Field of Search ......................... 385/88–94

[56] References Cited

U.S. PATENT DOCUMENTS

| | | | |
|---|---|---|---|
| 5,684,902 | 11/1997 | Tada | 385/88 |
| 5,848,210 | 12/1998 | Kimura | 385/89 |
| 5,909,523 | 6/1999 | Sakaino et al. | 385/88 X |

FOREIGN PATENT DOCUMENTS

| | | |
|---|---|---|
| 57-58114 | 4/1982 | Japan . |
| 1-130112 | 5/1989 | Japan . |
| 5-82810 | 4/1993 | Japan . |
| 5-95123 | 4/1993 | Japan . |
| 5-264870 | 10/1993 | Japan . |
| 5-267694 | 10/1993 | Japan . |
| 5-73610 | 10/1993 | Japan . |
| 6-275870 | 9/1994 | Japan . |
| 8-94887 | 4/1996 | Japan . |
| 8-274354 | 10/1996 | Japan . |
| 9-61674 | 3/1997 | Japan . |

OTHER PUBLICATIONS

Japanese Office Action dated Oct. 26, 1999, with partial translation.

*Primary Examiner*—Phan T. H. Palmer
*Attorney, Agent, or Firm*—McGinn & Gibb, P.C.

[57] ABSTRACT

A light-receptive module according to the present invention includes a board, a light-receptive element disposed with a light input face thereof facing toward the surface of the board, and an optical fiber disposed in a slot formed on the surface of the board and coupled with the light-receptive element. The optical fiber has an end face formed obliquely to the surface of the board so that light is emitted toward a light receive face thereof. The end of the slot has a recession formed in parallel with the surface of the board so that it contacts partially with the end face. The end face is formed at a total internal reflection angle so that light emitted from the optical fiber is subjected to total internal reflection. On the board is formed a slot in which the optical fiber is disposed. The optical fiber is secured to the slot in such a way that the end is thrust into a recession formed in the end of the slot.

10 Claims, 7 Drawing Sheets

(a)

(b)

BACK
(SILICON BOARD CONTACT SIDE)
(a)

SURFACE
(b)

LIGHT-RECEPTIVE MODULE AND A METHOD FOR MANUFACTURING THE SAME

BACKGROUND OF THE INVENTION

1. Field of the Invention

The present invention relates to a light-receptive module used in optical communication or the like, and more particularly to a light-receptive module comprising a light-receptive element and an optical fiber disposed on a board, and a method for manufacturing the same.

2. Description of Related Art

In conventional light-receptive modules, for example, a light-receptive element is mounted on a submount board and an optical fiber is secured to a silicon board with a guide slot provided, together with an optical fiber retainer. The submount board, silicon board, and pre-amplifier are secured on a package in position.

Positions in a direction perpendicular to an optical axis depend on the mounting position of the light-receptive element in a carrier. Positions in an optical axis direction and those in a direction horizontal to the optical axis are determined by the mounting position of the carrier with respect to the optical axis of the fiber. In this configuration, a mounting precision is at best about ±20 μm and therefore it is difficult to obtain a high coupling efficiency with a satisfactory yield for a light-receptive element whose light receive diameter is 50 μm or less.

Since a carrier intervenes, the capacity of the light-receptive element plus the capacity of the carrier is regarded as the input capacity of a pre-amplifier of the following stage. For this reason, this structure is not suitable for high-speed, broadband modules requiring low capacity.

Light-receptive modules of a conventional configuration are susceptible to positional deviation due to this structural combination. This is because a light-receptive element and an optical fiber are mounted on different boards. The positional precision of the light-receptive element and the optical fiber 1 deteriorates due to a total of a positional deviation in the coupling of the light-receptive element 7 and the submount board 23, a positional deviation in the coupling of the optical fiber 1 and the silicon board 4, and a positional deviation between the silicon board and the submount board. A positional precision provided by this configuration is at best about ±20 to 30 μm. Therefore, it is difficult to obtain a high coupling efficiency with a satisfactory yield for a light-receptive element whose light receive diameter is 50 μm or less.

Additionally, it is difficult to apply conventional light-receptive modules to high-speed light-receptive modules. Since a light-receptive element is mounted on a submount board, an extra capacity will be added in addition to the capacity thereof. Furthermore, the need for a wiring with an electrode pattern bent 90 degrees on the submount board will inevitably bring about the parasitism of complex wiring capacities, wiring inductance, and the like. Generally, since pre-amplifiers performing high-speed operation are subject to the influence of an input section, this configuration in which extra parasitic components would be added is not suitable for light-receptive modules performing high-speed operation.

SUMMARY OF THE INVENTION

The first object of a light-receptive module according to the present invention is to miniaturize it by mounting a light-receptive element and an optical fiber on an identical silicon board. The second object of a light-receptive module according to the present invention is to decrease parasitic components and achieve satisfactory quick responsivity. Still another object is to reduce the number of parts to decrease assembly processes as well as to achieve high-precision mounting to reduce the number of assembly man-hours.

A light-receptive module according to the present invention includes a board, a light-receptive element disposed with a light input face thereof facing toward the surface of the board, and an optical fiber disposed in a slot formed on the surface of the board and optically coupled with the light-receptive element. The optical fiber has an end face formed obliquely to the surface of the board so that light is emitted toward the face on which light is incident. The end of the slot has a recession formed in parallel with the surface of the board so that it contacts partially with the end face. The end face is formed at a total internal reflection angle so that light emitted from the optical fiber is subjected to total internal reflection. The end has a reflection face coated with a metallic film.

A light-receptive module manufacturing method according to the present invention applies to a light-receptive module basically comprising a light-receptive element, an optical fiber in which its end is obliquely formed and light emitted after being reflected in the end is optically coupled to the light-receptive element, and a board on which the light-receptive element and the optical fiber are disposed. The method includes: a slot forming step of forming a first slot to dispose the optical fiber in the board; a recession forming step of forming a recession in the end of the first slot; and an optical fiber securing step of thrusting the end into the recession to secure the optical fiber to the slot.

The above described slot forming step includes: a first pattern forming step of forming a first pattern by coating other than the portion on the surface of the board in which a slot is formed; a first etching step of forming part of a slot by etching the portion of the board in which the first pattern does not exist; a second pattern forming step of forming a second pattern by removing the coating around the end of the slot from the first pattern; and a second etching step of forming the slot by etching the portion of the board in which the second pattern does not exist.

In the above described light-receptive module manufacturing method, the optical fiber securing step is preceded by an end face forming step of forming an end face obliquely at a total internal reflection angle at which light emitted from the optical fiber is subjected to total internal reflection. Moreover, a method for manufacturing a light-receptive module according to the present invention includes a reflection face forming step of forming a reflection face by coating the end with a metallic film.

According to a light-receptive module of the present invention, since a light-receptive element and an optical fiber can be secured on an identical board with high precision, the light-receptive element and the optical fiber can be optically coupled without adjustments so that a high coupling efficiency is obtained. Since no submount board is used, the light-receptive element and the IC can be directly connected, so that satisfactory high-frequency characteristics are obtained.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

First, before describing a light-receptive module and a method for manufacturing the same according to the present invention, conventional light-receptive modules will be described to ease an understanding of the present invention.

Figure 1:
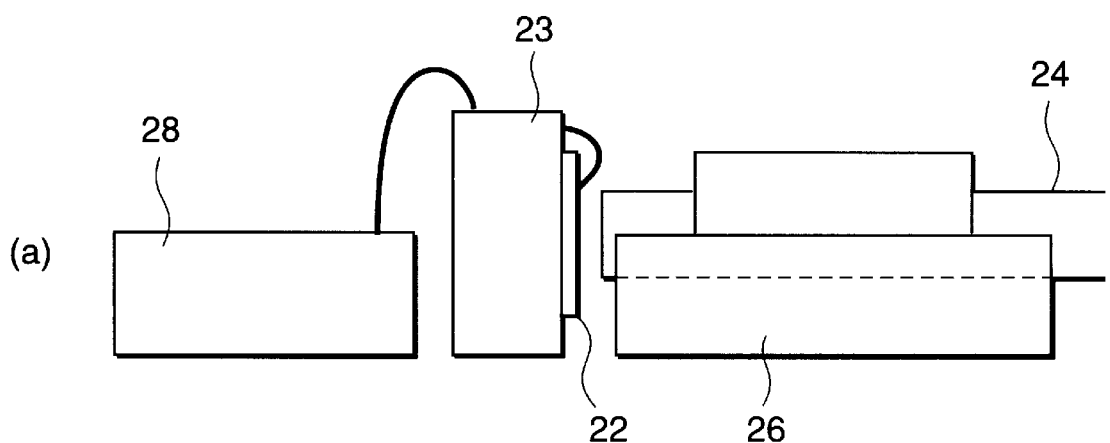
FIG. 1 shows a configuration of a conventional light-receptive module; (a) is a side view and (b) is a top view.
Figure 1:
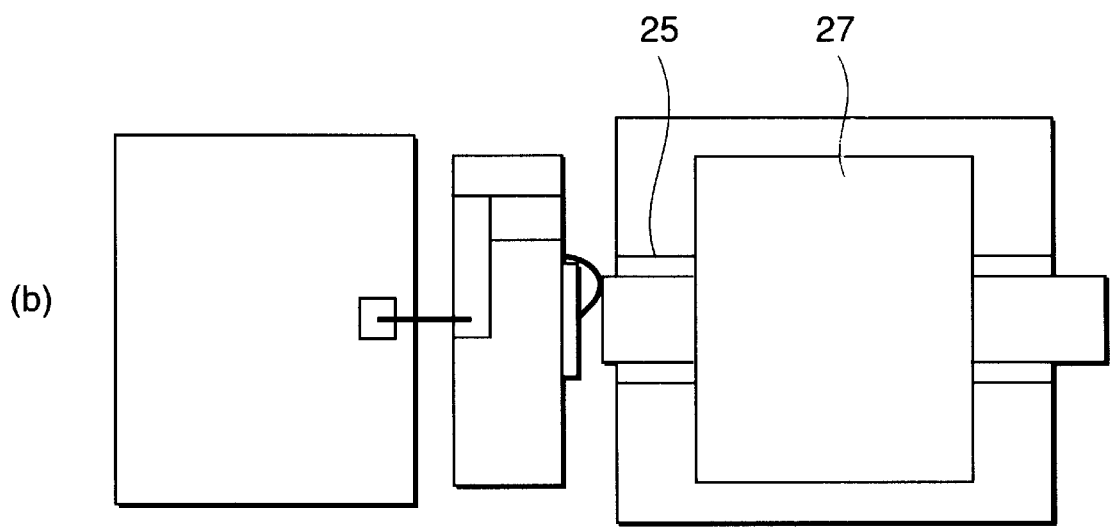

FIG. 1 shows a structure of a conventional light-receptive module.

A light-receptive module having a light receptive element (not illustrated in FIG. 1) 22 is mounted on a submount board 23. An optical fiber 24 is secured to a silicon board 26 with a guide slot 25 provided, together with an optical fiber retainer 27. The submount board 23, silicon board 26, and pre-amplifier 28 are secured on a package in position.

Positions in a direction perpendicular to an optical axis depend on the mounting position of the light-receptive element in a carrier. Positions in an optical axis direction and those in a direction horizontal to the optical axis are determined by the mounting position of the carrier with respect to the optical axis of the fiber. In this configuration, a mounting precision is at best about ±20 $\mu$m. Therefore, it is difficult to obtain a high coupling efficiency with a satisfactory yield for a light-receptive element whose light receive diameter is 50 $\mu$m or less. Since a carrier intervenes, the capacity of the light-receptive element plus the capacity of the carrier is regarded as the input capacity of a pre-amplifier of the following stage. For this reason, this structure is not suitable for high-speed, broadband modules requiring low capacity.

Light-receptive modules of a conventional configuration shown in FIG. 1 are susceptible to positional deviation due to the conventional combination. This is because, in a configuration shown in FIG. 1, a light-receptive element (not illustrated in FIG. 1) and an optical fiber 24 are mounted on different boards. The positional precision of the light-receptive element (not illustrated in FIG. 1) and the optical fiber 24 in FIG. 1 deteriorates due to a total of a positional deviation in the coupling of the light-receptive element (not illustrated in FIG. 1) and the submount board 23, a positional deviation in the coupling of the optical fiber 24 and the silicon board 26, and a positional deviation between the silicon board 26 and the submount board 23.

A positional precision provided by this configuration is at best about ±20 to 30 $\mu$m. Therefore, it is difficult to obtain a high coupling efficiency with a satisfactory yield for a light-receptive element whose light receive diameter is 50 $\mu$m or less.

A second problem of the configuration shown in FIG. 1 is difficulty in application to high-speed light-receptive modules. Since a light-receptive element (not illustrated in FIG. 1) is mounted on a submount board 23, an extra capacity will be added in addition to the capacity of the light-receptive element (not illustrated in FIG. 1). Furthermore, the need for a wiring with an electrode pattern bent 90 degrees on the submount board 23 will inevitably bring about the parasitism of complex wiring capacities and wiring inductance. Generally, since pre-amplifiers performing high-speed operation are subject to the influence of an input section, this configuration in which extra parasitic components would be added is not suitable for light-receptive modules performing high-speed operation.

Next, a light-receptive module and a method for manufacturing the same according to the present invention will be described in detail with the accompanying drawings.

Figure 2:
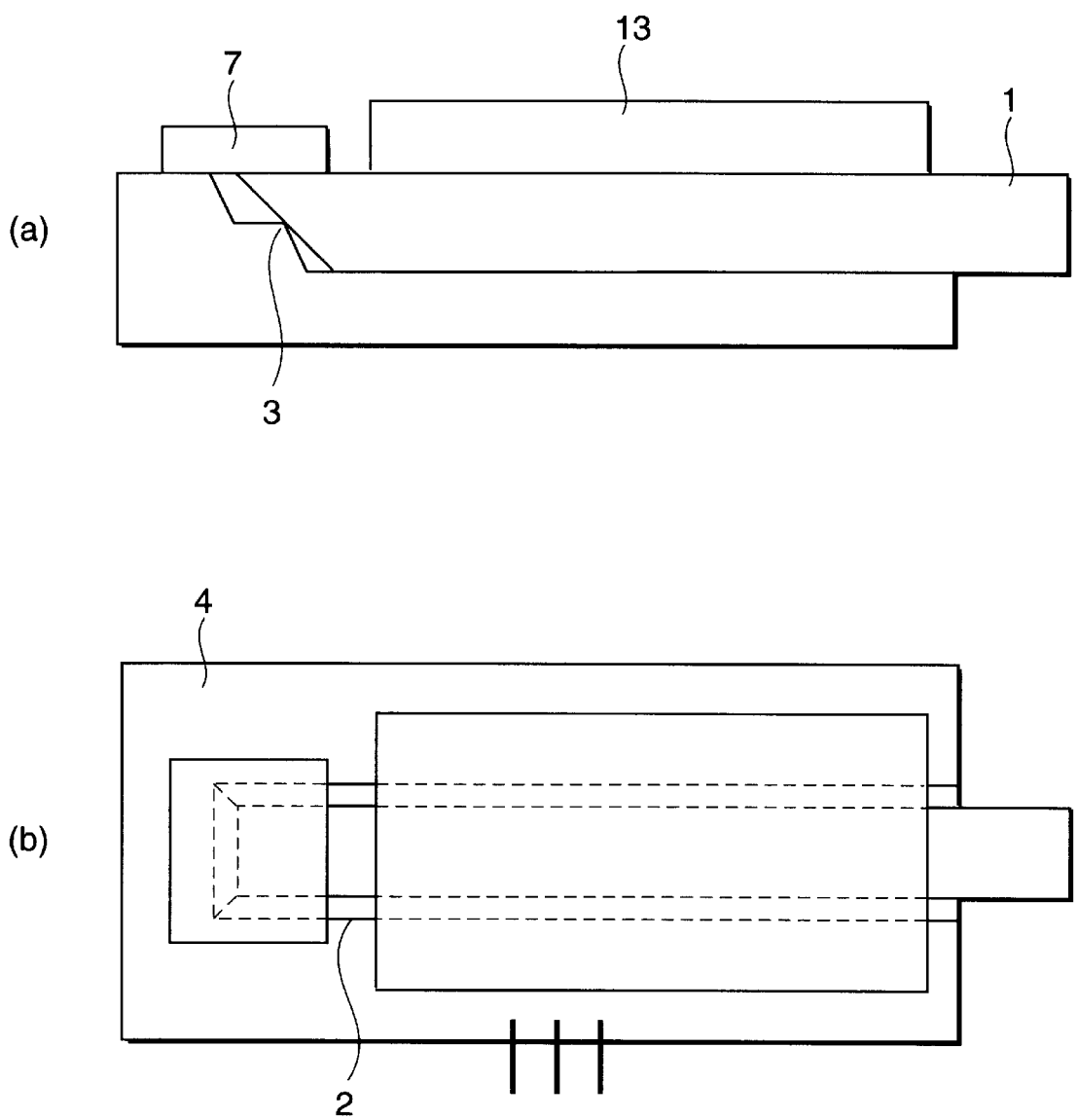
FIG. 2 shows a configuration of a first embodiment of a light-receptive module of the present invention; (a) is a side view and (b) is a top view.
Figure 3:
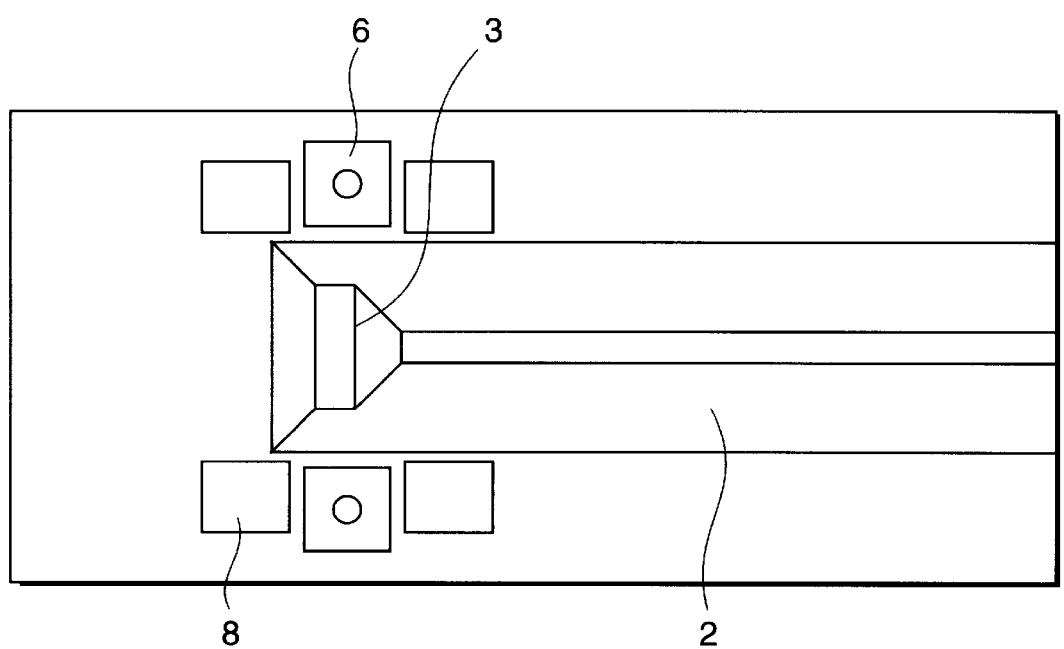
FIG. 3 shows a silicon board used in a first embodiment shown in FIG. 2.

FIG. 2 shows a configuration of an embodiment of a light-receptive module according to the present invention. FIG. 3 shows a silicon board of a light-receptive module according to the present invention.

A staged recession is formed inside a guide slot 2 for securing an optical fiber 1. The recession plays the role of a recession stopper 3 for thrusting the end 4 of the optical fiber 1 to a stop.

Figure 4:
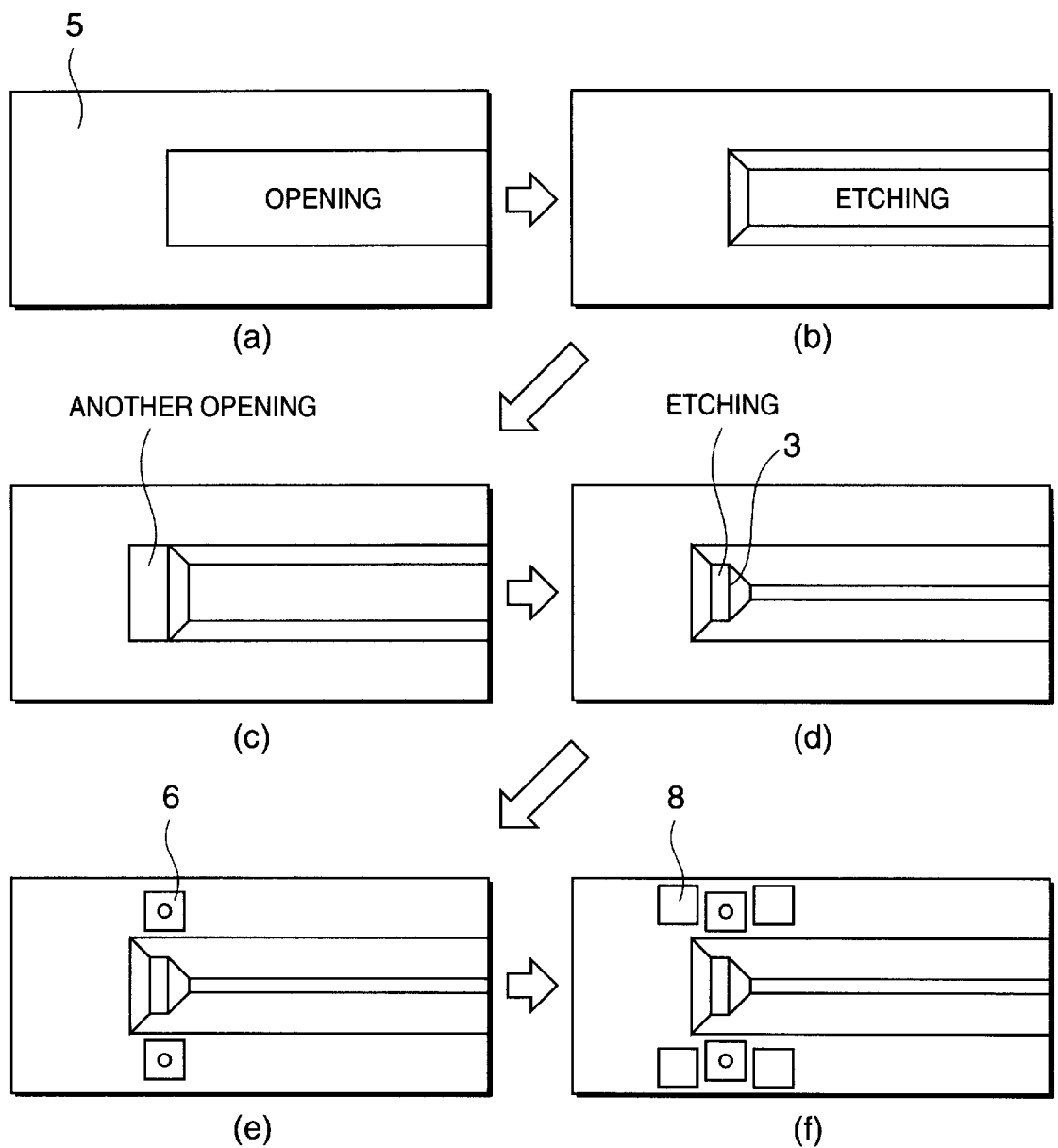
FIG. 4 shows the steps of manufacturing the silicon board shown in FIG. 3; (a) to (f) show the respective states of the board in the steps.

FIG. 4 shows a method for forming a silicon board 4. A guide slot 2 is formed by silicon anisotropic etching. First, a CrPtAu mask 5 is formed so that etching is performed over a slightly wider place than a place where a desired recession stopper 3 is formed. Second, etching is performed up to a depth convenient for forming the recession stopper 3 in the next step. Third, considering the recession stopper 3 and a clearance area at the end of the optical fiber 1, part of the CrPtAu mask 5 formed previously is opened. Fourth, etching is performed with control of solution concentration and time so that the height of the recession stopper 3 comes into a desired position.

Fifth, part of the CrPtAu mask 5 formed previously is opened, and alignment patterns 6 for mounting a visual alignment to use an infrared transmitted light are formed. The alignment patterns 6 are placed symmetrically with respect to the guide slot 2. The alignment patterns 6 are positioned so that they are in a desired positional relation with the optical axis of light emitted from the optical fiber 1 mounted in the guide slot 2. In the last step, an AuSn solder 8 for securing the light-receptive element 7 is formed.

Figure 5:
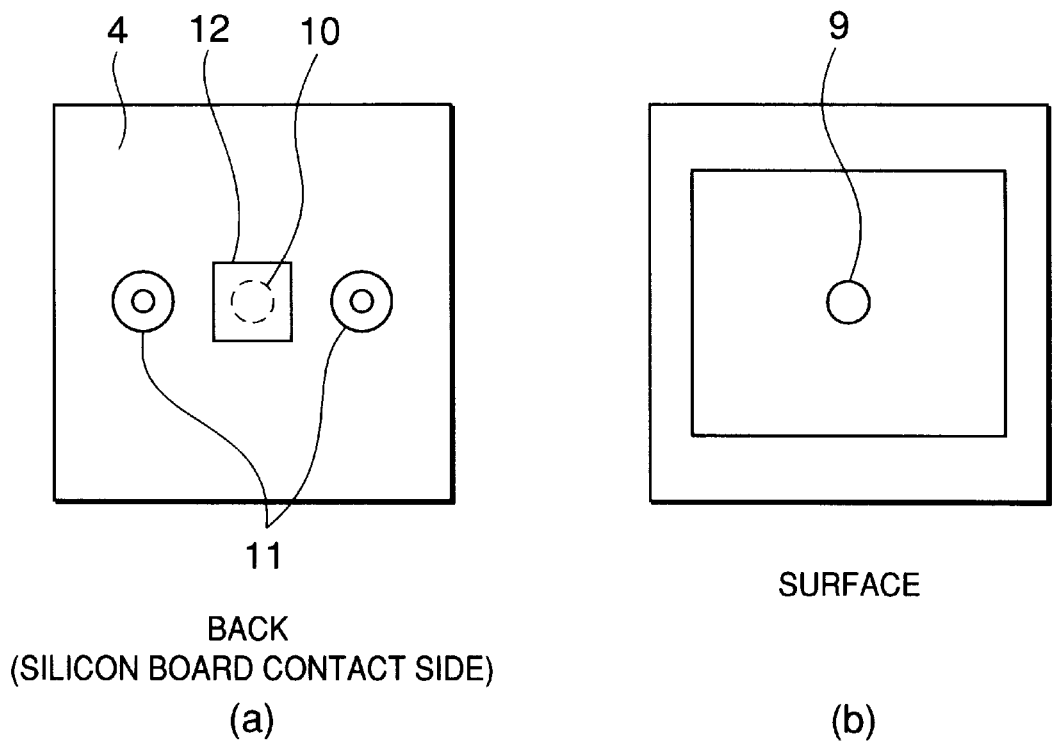
FIG. 5 shows a configuration of the light-receptive element used in the first embodiment shown in FIG. 2; (a) is a back view and (b) is a surface view.

FIG. 5 shows a light-receptive element 7 to be mounted. The light-receptive element has a light receive diameter of 30 $\mu$m on the back and has an electrode 9 on the surface formed on top of the light receive face 10 to suppress parasitic capacity. On the back are formed alignment patterns 11 for mounting a visual alignment and a pattern provided with a light input window 12 to admit signal light. The alignment patterns 11 are formed as part of metalize patterns and are disposed symmetrically with respect to the light receive face 10. An interval between the alignment patterns 11 is the same as that between the alignment patterns of the silicon board 4.

Figure 6:
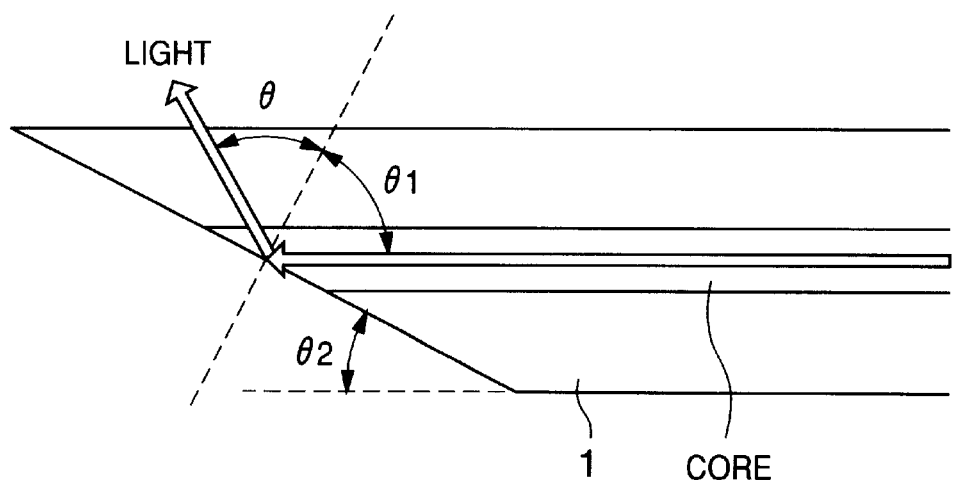
FIG. 6 shows a structure of the end of an optical fiber used in the first embodiment shown in FIG. 2.

FIG. 6 shows the end of the optical fiber 1 mounted in the guide slot 2. In the present embodiment, 1.3 µm SMF is applied to the optical fiber. A grinding angle θ1 at the end is set so that the following expression is satisfied as a total internal reflection condition of the optical fiber and air layer:

$$\theta_2 > \sin^2(n1/n2).$$

When n1=1 and n2=1.47, θ2 is set to 42.9 degrees, and therefore 47.1 degrees or less is permitted as θ1. In the present embodiment, θ2 is set to 40±1 degrees to minimize return light reflected from the back of the light-receptive element 7.

A reflection face formed at the end of the optical fiber 1 can also be coated with a metallic film such as CrAu. In this case, flexibility in designing a reflection angle is improved in comparison with the use of a total internal reflection angle by a refraction factor difference. The optical fiber is also not limited to 1.31-µm SMF; any optical fiber which allows a reflection face to be formed at the end can be applied as desired.

The light-receptive module shown in FIG. 2 is assembled in such a way that, after the light-receptive element 7 is secured to the silicon board 4 with a visual alignment mounted, the optical fiber 1 is inserted and secured by the optical fiber retainer 13.

Figure 7:
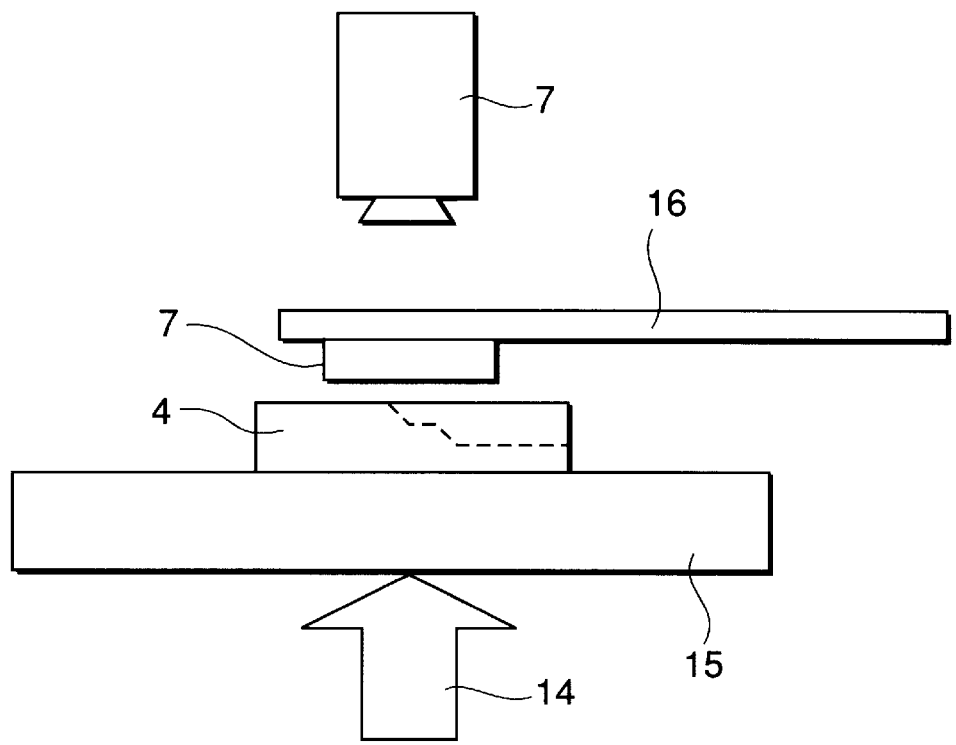
FIG. 7 shows a method for securing the silicon board shown in FIG. 3 and the light-receptive element shown in FIG. 4.

FIG. 7 shows a method for securing the light-receptive element 7 to the silicon board 4 by mounting a visual alignment. The light-receptive element 7 supported by an arm 16 is stacked on the silicon board 4 mounted on top of a heater 15 to which infrared light can be projected from the bottom, and the alignment patterns 6 and 11 of the silicon board 4 and light-receptive element 7 are taken by a camera 17 for image recognition and position processing.

Figure 8:
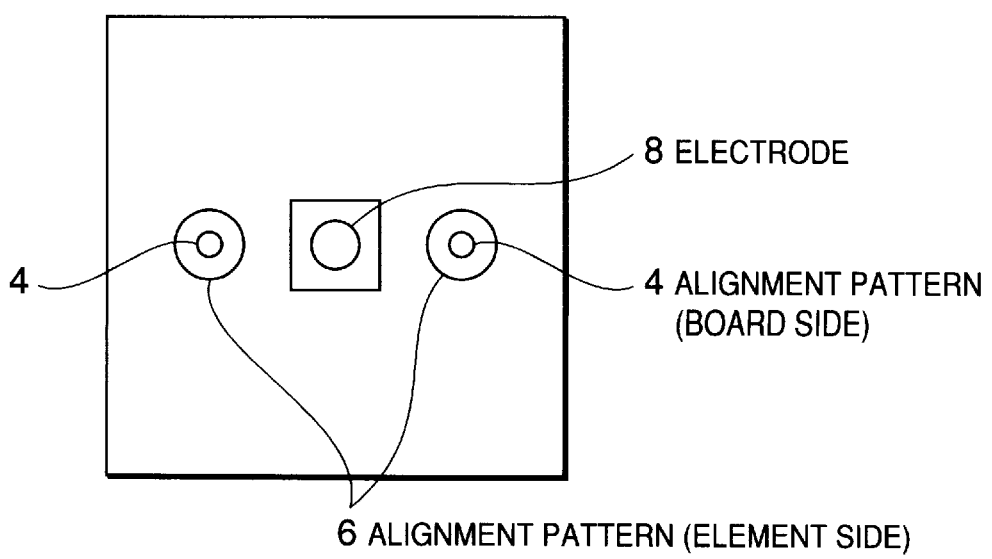
FIG. 8 shows the overlapping of the silicon board and the light-receptive element in the first embodiment.

FIG. 8 shows the silicon board 4 overlaid by the light-receptive element 7. The arm 16 is adjusted so that the alignment pattern 6 of the silicon board 4 is positioned at the center of the alignment pattern 11 of the light-receptive element 7. When a desired positional relationship is obtained, the heater 15 is heated. As a result of the heating, the AuSn solder 8 on the silicon board 4 is melted and the silicon board 4 and the light-receptive element 7 are secured. According to the securing method shown in FIG. 7, the securing precision of the silicon board 4 and the light-receptive element 7 is within the range of an error of the visual alignment mounting method, which is a satisfactory mounting precision of submicron meters.

The optical fiber 4 is secured in such a way that its end face is brought into contact along the recession stopper 3 formed within the guide slot 2. Accordingly, the positional relationship between the optical fiber 1 and the light receive face 10 is determined on the order of submicron meters. Since an optical length between the end of the optical fiber 1 and the light receive face 10 is as small as the sum of the radius of the optical fiber 1 and the board thickness of the light-receptive element 7, a beam diameter spreads small and a high coupling efficiency is obtained easily.

In the structure shown in FIG. 2, as the result of evaluating optical coupling characteristics with the optical fiber and the light-receptive element secured, it was found that quantum efficiency was about only 0.1 dB lower than that at adjustment to an optimum position of the optical fiber. According to a manufacturing method of the present invention, high-precision mounting can be achieved without adjustment.

Figure 9:
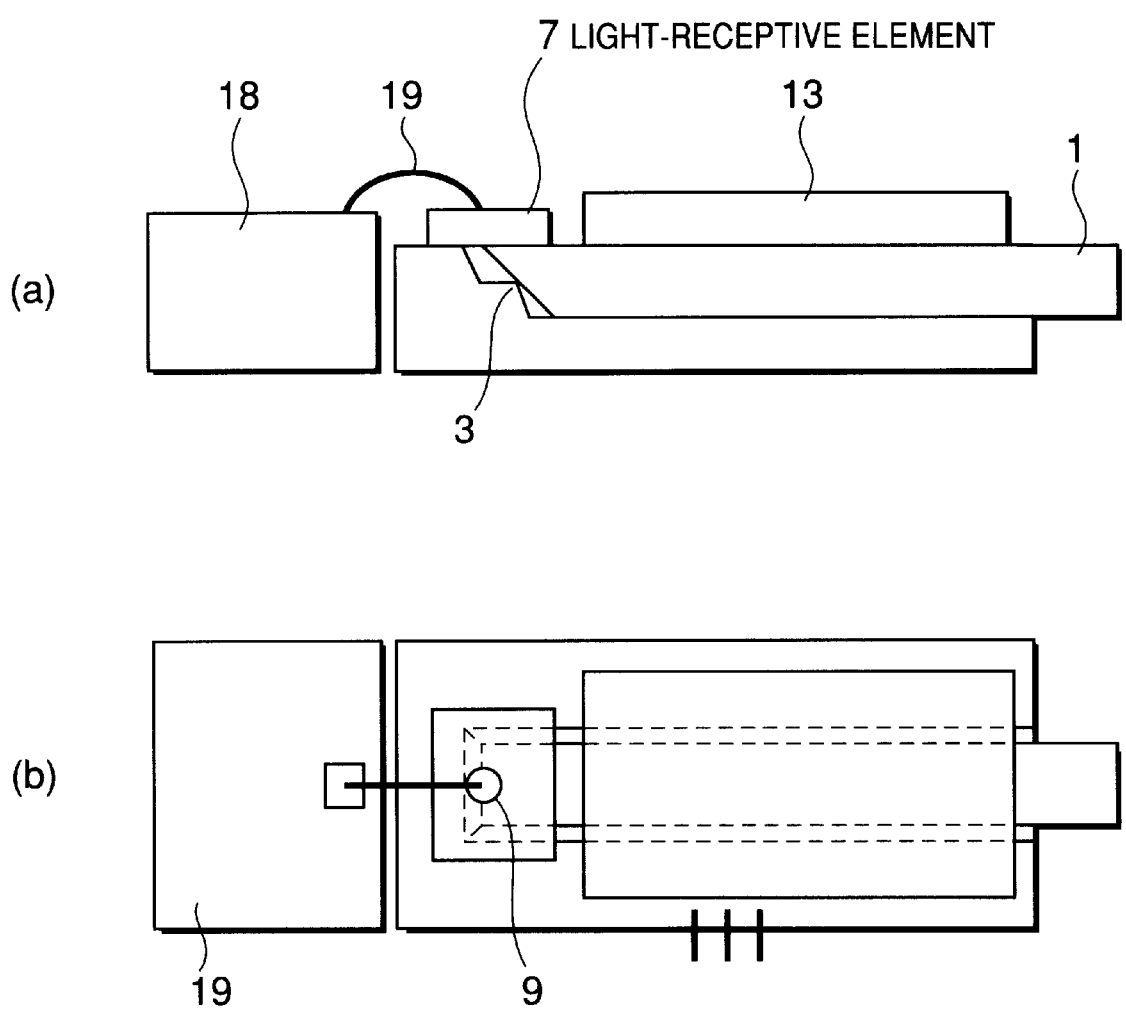
FIG. 9 shows a connection between the light-receptive module and the pre-amplifier of the first embodiment shown in FIG. 2; (a) is a side view and (b) is a top view.

FIG. 9 shows a connection between the present light-receptive module and a pre-amplifier 18. The light-receptive module of the present invention is directly connected to a bonding pad 19 of the pre-amplifier 18 by a wire 20 at the electrode 9 of the light-receptive element 7. Such a construction is very effective for pre-amplifiers having high parasitic sensitivity because little parasitic capacity is added to the input section of the pre-amplifier 18.

As described above, the light-receptive module of the present invention comprises a board, a light-receptive element with a light receive face thereof facing toward the surface of the board, and an optical fiber coupled to the light-receptive element, disposed in a slot formed on the surface of the board. The optical fiber has an end face formed obliquely to the surface of the board so that light is emitted to the light receive face from the optical fiber. The end of the slot has a recession formed in parallel with the surface of the board so that it contacts partially with the end face. The end face is formed at a total internal reflection angle so that light emitted from the optical fiber is subjected to total internal reflection.

Accordingly, high optical coupling efficiency can be obtained by a simple mounting not adjusted. Namely, a light-receptive element and an optical fiber can be secured in desired positions on a silicon board with high precision by visual alignment mounting and a recession stopper formed in a guide slot. Optical coupling length is shortened and coupling loss is reduced.

The light-receptive module of the present invention, which eliminates the need for a submount board which has been necessary conventionally, offers a significant reduction in parasitic capacity and improved high-frequency characteristics.

As described above, since the light-receptive module of the present invention allows an optical element and an optical fiber to be secured without adjustment with high precision, high-performance optical modules can be produced with high productivity.

While this invention has been described in connection with certain preferred embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

What is claimed is:

1. A light-receptive module, comprising: a board; a light-receptive element disposed with a light input face thereof facing toward the surface of said board, light being incident on said light input face; and an optical fiber disposed in a slot formed on the surface of said board and optically coupled with said light-receptive element, wherein said optical fiber has an end face thereof formed obliquely to the surface of said board so that light is emitted to said light input face, and wherein the end of said slot has a recession formed so that it contacts partially with said end face.

2. A light-receptive module according to claim 1, wherein said recession is parallel with the surface of said board.

3. A light-receptive module according to claim 1, wherein said end face is formed at a total internal reflection angle at which light emitted from said optical fiber is subjected to total internal reflection.

4. A light-receptive module according to claim 2, wherein said end face is formed at a total internal reflection angle at which light emitted from said optical fiber is subjected to total internal reflection.

5. A light-receptive module according to claim 1, wherein said end has a reflection face coated with a metallic film.

6. A method for manufacturing a light-receptive module comprising a light-receptive element; an optical fiber in which its end is obliquely formed and light emitted after being reflected in said end is optically coupled to said light-receptive element; and a board on which said light-receptive element and said optical fiber are disposed, said method including the steps of:

forming a first slot to dispose said optical fiber in said board;

forming a recession in an end of said first slot;

and thrusting said end into said recession to secure said optical fiber to said slot.

7. A method for manufacturing a light-receptive module according to claim 6, wherein said slot forming process includes:

a first pattern forming step of forming a first pattern by coating other than the portion on the surface of said board in which said slot is formed;

a first etching step of forming part of said slot by etching the portion of said board in which said first pattern does not exist;

a first pattern forming step of forming a second pattern by removing said coating around the end of said slot from said first pattern;

and a second etching step of forming said slot by etching portions of said board in which said second pattern does not exist.

8. A method for manufacturing a light-receptive module according to claim 7, wherein said optical fiber securing step is preceded by an end face forming step of forming said end face obliquely at a total internal reflection angle at which light emitted from said optical fiber is subjected to total internal reflection.

9. A method for manufacturing a light-receptive module according to claim 6, wherein said method includes a reflection face forming step of forming a reflection face by coating said end with a metallic film.

10. A method for manufacturing a light-receptive module according to claim 6, wherein said method includes a reflection face forming step of forming a reflection face by coating said end with a metallic film.

* * * * *